(12) United States Patent
Martens

(10) Patent No.: US 11,371,582 B2
(45) Date of Patent: Jun. 28, 2022

(54) RATCHET LOAD BINDER WITH TWO HANDLES

(71) Applicant: Koen Martens, Meerhout (BE)

(72) Inventor: Koen Martens, Meerhout (BE)

(73) Assignee: Koen Martens, Meerhout (BE)

( * ) Notice: Subject to any disclaimer, the term of this patent is extended or adjusted under 35 U.S.C. 154(b) by 151 days.

(21) Appl. No.: 16/944,690

(22) Filed: Jul. 31, 2020

(65) Prior Publication Data

US 2020/0362942 A1 Nov. 19, 2020

Related U.S. Application Data

(63) Continuation of application No. PCT/EP2018/052941, filed on Feb. 6, 2018.

(51) Int. Cl.
| | | |
|---|---|---|
| *F16G 11/00* | (2006.01) | |
| *F16G 11/12* | (2006.01) | |
| *F16B 7/06* | (2006.01) | |
| *F16G 3/00* | (2006.01) | |

(52) U.S. Cl.
CPC ............... *F16G 11/12* (2013.01); *F16B 7/06* (2013.01); *F16G 3/006* (2013.01)

(58) Field of Classification Search
CPC . F16G 11/12; F16G 3/006; F16B 7/06; B66D 1/20; B66D 3/02
See application file for complete search history.

(56) References Cited

U.S. PATENT DOCUMENTS

| | | |
|---|---|---|
| 2,673,632 A | 3/1954 | Stiranka |
| 4,130,269 A | 12/1978 | Schreyer |
| 6,178,603 B1 * | 1/2001 | Lillig ............ F16G 11/12 254/222 |
| 8,505,879 B2 | 8/2013 | Ruan |
| 8,851,255 B2 | 10/2014 | Mitchell |
| 2014/0326935 A1 | 11/2014 | Chao |

FOREIGN PATENT DOCUMENTS

| | | |
|---|---|---|
| CA | 2760240 A1 | 2/2013 |
| DE | 202010007530 U1 | 8/2010 |
| WO | 2019154478 A1 | 8/2019 |

OTHER PUBLICATIONS

ISR-WO for parent application PCT/EP2018/052941 dated Oct. 26, 2018.

* cited by examiner

*Primary Examiner* — Emmanuel M Marcelo
(74) *Attorney, Agent, or Firm* — Vorys, Sater, Seymour and Pease LLP

(57) ABSTRACT

The current invention relates to a load binder comprising an axially extending elongate, preferably tubular, member, two shanks, a first and second ratchet wheel, a first and second oscillatory handle; said member comprising end portions comprising inner screw threads in relatively opposite directions so as to accommodate said shanks which are correspondingly screw-threaded and which comprise distal ends, preferably eyes; whereby rotation of the member in one direction causes the distal ends to draw together and rotation of the member in relatively opposite direction causes the distal ends to spread apart; whereby said rotation of said member is effected by a ratchet mechanism which involves the provision of said first and said second ratchet wheel which are suitably secured intermediate the ends of the member and are rotatably mounted between mutually spaced first side members which project from said first and second handle.

16 Claims, 3 Drawing Sheets

RATCHET LOAD BINDER WITH TWO HANDLES

TECHNICAL FIELD

The invention pertains to the technical field of load binders with a ratchet mechanism.

BACKGROUND

There remains a need in the art for an improved ratchet load binder.

U.S. Pat. No. 2,673,632 discloses a ratchet turnbuckle, but is not easy to operate manually.

U.S. Pat. No. 4,130,269 describes a ratchet load binder with telescopic shanks, but is equally not easy to operate manually.

In U.S. Pat. No. 8,505,879, a rigid tie down is disclosed involving a locking mechanism which may be difficult to operate and suffers increased wear.

CA 2760240 discloses a ratchet load binder with removable lever, but lacks means to facilitate manual operation of the load binder.

US 2014/0326935 discloses a ratcheting load binder with enclosed ratchet mechanism which is complex and may lack wear resistance.

The present invention aims to resolve at least some of the problems mentioned above, with a load binder that is easy to operate manually.

SUMMARY OF THE INVENTION

The present invention provides a load binder comprising an axially extending elongate, preferably tubular, member, two shanks, a first ratchet wheel and a first oscillatory handle; said member comprising end portions comprising inner screw threads in relatively opposite directions so as to accommodate said shanks which are correspondingly screw-threaded and which comprise distal ends, preferably eyes; whereby rotation of the member in one direction causes the distal ends to draw together and rotation of the member in relatively opposite direction causes the distal ends to spread apart; whereby said rotation of said member is effected by a ratchet mechanism which involves the provision of said first ratchet wheel which is suitably secured intermediate the ends of the member and is rotatably mounted between mutually spaced first side members which project from said first handle.

Said load binder comprises a second ratchet wheel and a second oscillatory handle; whereby said ratchet mechanism involves the provision of said second ratchet wheel which is suitably secured intermediate the ends of the member and is rotatably mounted between mutually spaced second side members which project from said second handle.

First, with two handles adequately provided, the invention is easier to operate and lasts longer than a state of the art load binder with one handle, because peak forces during operation are reduced. This is primarily due to an operator being able to spread force more evenly over time and/or over both hands.

Particularly, with two handles and a separate ratchet wheels provided for each handle, in one mode of use, the operator may alternatingly operate the ratchet with one hand and the other hand. This allows to speed up the overall process of tightening or releasing the load binder, with on average two operations with a handle per cycle where a state of the art load binder only allows one operation per cycle. In one embodiment, this increased number of operations per cycle may be used to speed up the load binding usage. In a preferred embodiment, the screw threads on the two shanks are provided with a lower pitch than those for common load binders, e.g. half the pitch when compared to the state of the art load binder according to U.S. Pat. No. 2,673,632. This results in a reduced tightening or releasing distance per operation, but the same overall speed per cycle. This may be advantageous since it allows a reduced peak force from the operator during each operation. This not only reduces the effort required from the operator, but also reduces the peak strain and torque exerted on several parts of the load binder, leading to less risk of load binder damage and reduced wear. Related, the effort of the operator is spread more evenly over time throughout each cycle.

In another mode of use, the operator may operate both handles essentially simultaneously. This yields an exertion of the same force as with a prior art load binder but spread over two hands, which is carried over to the load binder in a more evenly distributed fashion. Particularly, where the operator exerts essentially equal force on both hands, there is a significant reduction of torque on the portions of the member extending between the two levers, which is beneficial for material wear, and also allows for a modified and potentially lighter design of the member.

Second, with peak forces during operation reduced, less leverage is required during use, and the length of the handles may be reduced when compared to a prior art load binder. Shorter handles may be advantageous because they yield a lighter load binder, but also because a load binder with shorter handles is easier to manipulate in small spaces. Furthermore, it is a well-known problem of load binders that the handle may cause on obstruction. Where the load binder is in use, e.g. where the load binder is keeping a tightened cable in position, shorter handles provide for less hindrance when moving around the load binder. When the load binder is not in use, having shorter handles may allow for more convenient storage.

Preferred embodiments and their advantages are discussed in the detailed description and the dependent conclusions.

DETAILED DESCRIPTION OF THE INVENTION

Figure 1:
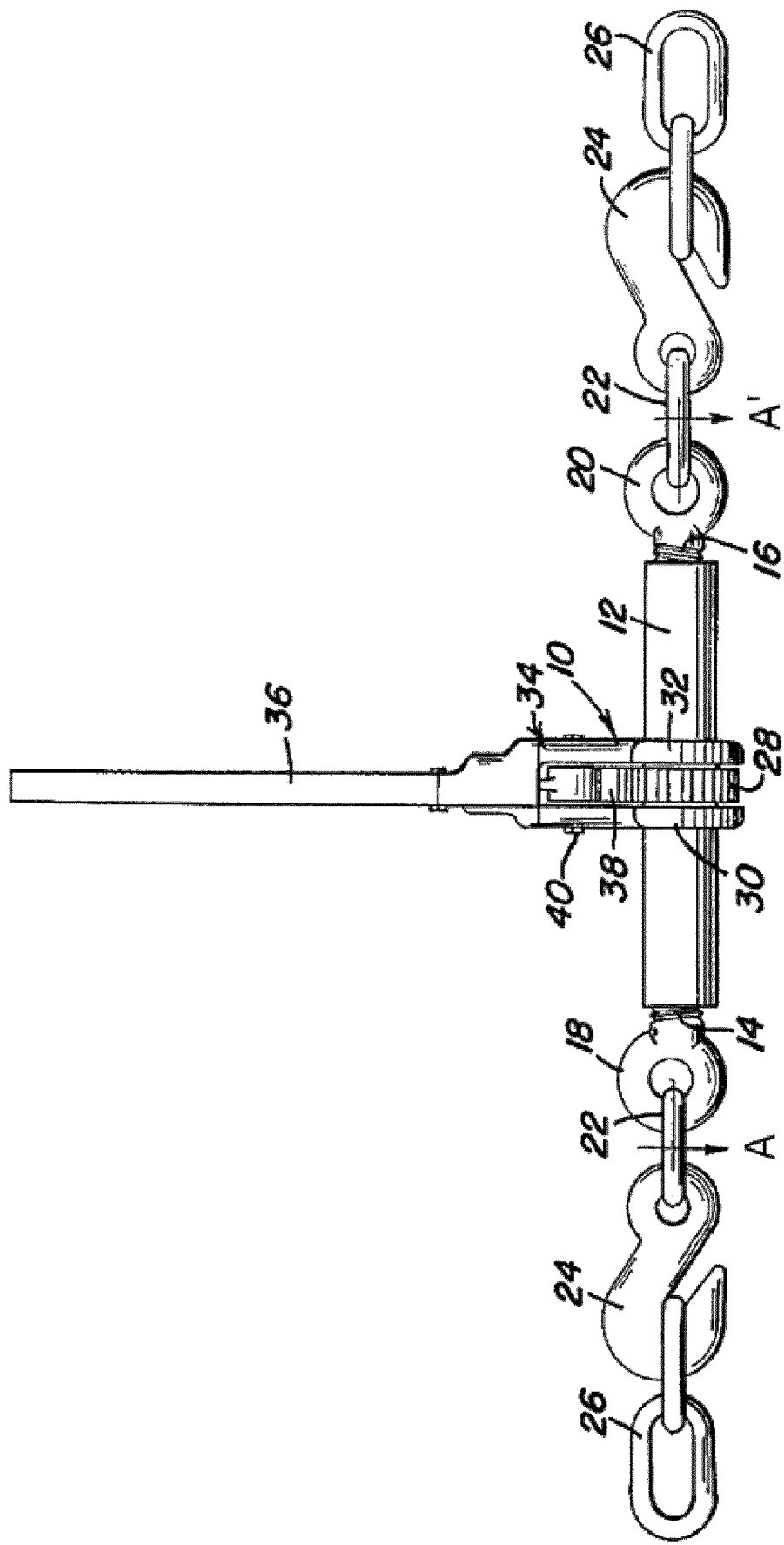
FIG. 1 is a side elevation view of a prior art load binder according to U.S. Pat. No. 2,673,632.

The present invention provides a load binder comprising an axially extending elongate, preferably tubular, member, two shanks, a first ratchet wheel and a first oscillatory handle; said member comprising end portions comprising inner screw threads in relatively opposite directions so as to accommodate said shanks which are correspondingly screw-threaded and which comprise distal ends, preferably eyes; whereby rotation of the member in one direction causes the distal ends to draw together and rotation of the member in relatively opposite direction causes the distal ends to spread apart; whereby said rotation of said member is effected by a ratchet mechanism which involves the provision of said first ratchet wheel which is suitably secured intermediate the ends of the member and is rotatably mounted between mutually spaced first side members which project from said first handle.

Said load binder comprises a second ratchet wheel and a second oscillatory handle; whereby said ratchet mechanism involves the provision of said second ratchet wheel which is suitably secured intermediate the ends of the member and is rotatably mounted between mutually spaced second side members which project from said second handle.

In a preferred embodiment, the second handle is essentially identical to the first handle. For most applications and most operators, equal handles are convenient since they allow to distribute work evenly over both hands. In alternative embodiments, one handle may be shorter than another, e.g. to account for applications where one handle should be longer to increase leverage for this handle, e.g. because this handle is harder to reach for the operator than the other handle for reasons such as large height or limited access space.

In a preferred embodiment of the invention, said first handle and said second handle are provided essentially symmetrically with respect to a middle section of said member. Hereby, the middle section of said member is a cross section of the member at half the length L of the member. In this document, the length L of the member corresponds to the distance between the axially outermost ends of the end portions of the member. Equivalently or alternatively, a distance between the axially outermost end of one end portion of the member and the first handle is substantially equal to the distance between the axially outermost end of the other end portion of the member and the second handle. Hereby, said distance between said first handle and said axially outermost end of said one end portion of the member may be defined as the distance between the middle section of the first ratchet wheel and said axially outermost end of said one end portion of the member. Likewise, the distance between said second handle and said axially outermost end of said other end portion of the member may be defined as the distance between the middle section of the second ratchet wheel and said axially outermost end of said other end portion of the member.

In a preferred embodiment, said first and said second handle are separated by a spacing S equaling at least 40% of a length L of said member, preferably at least 45% of said length L, more preferably at least 50% of said length L. Hereby, said percentage may be obtained as the ratio of the distance between the middle sections of the first and second ratchet wheel and the length L of the member. This embodiment relates to the position of the handles being closer to the end portions of the member than would be the case if the handles where provided "uniformly" over the member, i.e. with the spacing S and the distance between the levers and the outermost ends of the end portions all equaling approximately 33% ($\frac{1}{3}^{rd}$). An embodiment with S larger than 33% is advantageous because it allows an operator to exert force via the handles in close proximity to the inner screw threads of the member at each end portion, i.e. the place where rotational energy is converted into an axial translation. This allows for a more direct and more efficient transfer of force, particularly if the operator manipulates the handles simultaneously. Another advantage is the proximity of the ratchet wheels to the inner screw threads of the member at the end portions is that the securing of the ratchet wheel allows for additional "clutching", whereby the shanks are held more tightly by the portions of the member surrounding them.

In a preferred embodiment, said member is composed of metal for at least 80 percent by volume, preferably of steel for at least 80 percent by volume. Such an embodiment allows for a sturdy and reliable design. Preferably a protective layer such as paint and/or a thin film coating is provided to protect the material against oxidation and/or to provide an operator with a better grip.

According to yet another embodiment, said first and second handle (36) are composed of aluminum for at least 80 percent by volume. Such an embodiment is advantageous since this may reduce the overall weight of the load binder.

In a preferred embodiment, said member comprises a first opening provided intermediate the first and second handle, said opening preferably provided on the middle section of said member. Such an opening may be advantageous in use of the load binder, since it prevents the built-up of air pressure inside the member when the shanks are drawn together. Likewise, it prevents an undesired underpressure when the shanks are spread apart. Additionally, it may allow liquids from external factors such as rain to flow away if present within the member. In a preferred embodiment where the handles are sufficiently spaced, the opening can be conveniently and efficiently placed in the middle of the member, where the effectivity of such an opening is highest. In a more preferred embodiment, comprises at least a second opening provided intermediate the first and second handle and essentially diametrically with respect to said opening, said opening and said second opening preferably provided on the middle section of said member. With more than one opening, said liquids from external factors such as rain may flow away in more positions of the load binder, mostly regardless of the exact angle over which the member is rotated. Moreover, a second opening positioning essentially diametrically with respect to the first opening allows to stick a wire or pointy object through the member, which may provide for a fixation point, facilitating storage and/or manufacturing and/or maintenance of the load binder. In a preferred embodiment, the handles are provided symmetrically and both openings are provided are provided on the middle section of the member, allowing further possible advantages in storage and/or manufacturing and/or maintenance of the load binder.

In another preferred embodiment, said member comprises a central segment extending between and beyond the first and second handle having a first cross diameter and two end segments comprising said end portions comprising said inner screw threads in relatively opposite directions and having an essentially identical second cross diameter; wherein said first cross diameter of the central segment and said second cross diameter of the two end segments are such that the end segments may be received by the central segment in a clamping attachment. Such an embodiment is advantageous both in manufacturing and in use of the load binder. First, the manufacturing of the member is easier than for the prior art load binder, for which "upset" portions need to be provided and screw-threaded by separate machine processes which involve the complete member. In contrast, for a member comprising three segments, two end segments with appropriate diameter may simply be selected from a range of existing machine parts, so avoiding the need for providing upset portions. Related, the process of providing screw treads only involves the end segments, which are to be combined with the central segment only later on in the manufacturing. Second, in a preferred embodiment the handles are provided near the two end portions of the member, which advantageously combines with the clamping attachment of the end segments by the central segment. Particularly, in a preferred embodiment whereby the central segment extends not more than 50 mm beyond the axially outermost members next to each of the handles, more preferably not more than 30 mm, the clamping of the central segment by the ratchet wheel provides for additional support of the clamping of the end segments by the central segment, and hence for additional structural integrity in the use. In a further preferred embodiment, the central segment and the end segments comprise metal, preferably essentially consist of metal, and that said clamping attachment involves welding. This allows for enhanced structural integrity. In another further preferred embodiment, the central segment is tubular and is characterized by a first wall thickness with a first average value; wherein the two ends segments have an essentially identical circular inner cross section comprising said inner screw threads and an essentially identical polygonal outer cross section, preferably a hexagonal outer cross section; and wherein said two end segments are characterized by a second wall thickness with a second average value exceeding said first average value. This may be advantageous to ensure reliable clamping of the end segments by the central segment. Another advantage may be the ease to clamp the end segments during processing involving the threading, given their polygonal outer cross section.

In yet another preferred embodiment, at least one of said first and said second handle is detachable; wherein preferably both said first and said second handle are detachable. A mechanism for detaching the handles may for instance be as described in U.S. Pat. No. 8,851,255. Detachable handles may be advantageous in storage and use. Hereby, with the shorter handles allowed by the invention, the overall weight of the two handles may be equal or even lower than that of a prior art detachable handle such as the one of U.S. Pat. No. 8,851,255.

In a preferred embodiment, said two shanks comprise a first shank and a second shank; said first shank having an axially extending cylindrical void adapted to telescopically receive therewithin said second shank, said second shank having an outside diameter smaller than the inside diameter of said cylindrical void; wherein said second shank includes a screw-threaded length at least long enough to extend from the axially outermost end of one of said end portions to a position radially adjacent to the inner screw threads of the opposite end portion; wherein the screw threads of said second shank have a pitch which is greater than the pitch of the screw threads of said first shank; wherein said cylindrical void of said first shank has a length at least long enough to extend from the axially innermost end of one of said end portions to a position radially adjacent to the inner screw threads of the opposite end portion; and wherein said end portions of said member comprise inner screw threads adapted to the second shank having said outside diameter smaller than an outside diameter of the first shank and the screw threads of the second shank having greater pitch than the screw threads of the first shank. The advantage of such an embodiment lie in that the second shank may move a greater axial distance than the first shank when the load binder is worked, thereby permitting the second shank to have a length greater than the operative thread length of the first shank. In order to accommodate the penetration of the smaller second shank into the larger first shank, the larger member's cylindrical axial void extends past its operative thread length. The increased length and larger thread pitch of the second shank and the increased depth of the axial cylindrical void of the first shank account for the increased reach of the load binder.

In yet another embodiment, for at least one of said first and second handle, said ratchet mechanism comprises a means for varying a transmission ratio between oscillatory displacement of the handle and rotary displacement of the member, said means preferably comprising a transmission ratchet wheel comprised in said first or second handle; said transmission ratio preferably based on a ratio of a number of teeth of the first or second ratchet wheel and a number of teeth of said transmission ratchet wheel; said transmission ratchet wheel adapted for converting an oscillatory displacement of the first or second handle at an oscillatory speed into a rotary displacement of said transmission wheel ratchet at a first rotary speed directly corresponding to said oscillatory speed; said transmission ratchet wheel further adapted for converting said rotary displacement of said transmission wheel ratchet into a rotary displacement of said first or second ratchet wheel mounted on said member at a second rotary speed essentially equal to the first rotary speed and the transmission ratio. Such a transmission allows to further customize the usage of the load binder to the needs of a specific operator and/or the given application.

In a preferred embodiment, at least one of said distal ends is an eye; and said load binder further at least one hook rotatably mounted on said at least one eye according to a knee joint comprising a positioning axis, preferably by means of a knee pin extending along said positioning axis. In a further preferred embodiment, said distal ends are eyes; and said load binder further comprises two hooks rotatably mounted on said eyes according to a knee joint comprising a positioning axis, preferably by means of a knee pin extending along said positioning axis. This may be advantageous since it avoids undesired dislocation in the proximity of the eyes. This may for instance be useful in the exemplary case where the load binder is used to tighten a chain composed of metal links, whereby the links are relatively large when compared to the eyes, allowing smooth dislocation of the chain links with respect to the eyes. By using sufficiently large hooks, the effects of dislocation can be mitigated. In a further preferred embodiment, at least one of said knee joints comprises means, preferably both said knee joints comprising means, for securing a position of said knee joint with respect to said positioning axis according to a positioning angle ($\alpha$), said means preferably relating to any or any of the following: friction-based positioning; recess-based positioning; locking-pin-based positioning; screw-based positioning. Such an embodiment may be advantageous in that it allows the operator, to some extent, to control the positioning angle, or, equivalently, blocking angle, during the securing of the load binder. This allows the operator to easily connect the hooks to further attachment means such as a cable, even if these attachment means are e.g. partially out of reach or present in some confined area that hinders maneuvering.

In a preferred embodiment, the means for securing the position may relate to friction-based positioning that is based for instance on provisions for said knee pin extending along said positioning axis. For instance, the knee pin may be adapted to provide for friction with respect to rotation along the positioning axis, allowing the operator to control the positioning angle. In such an embodiment, the positioning angle can preferably be set continuously, i.e. taking on any angle in a given range, e.g. any value in the range 0 to 90 degrees, or any value in the range −90 degrees to 90 degrees.

In another preferred embodiment, the means for securing the position may relate to recess-based positioning, whereby the knee joint preferably comprises a first surface comprising at least one protrusion and a second surface comprising at least one recess, said first and second surface adapted for interlocking of said protrusion and said recess for fixing said positioning angle. In such an embodiment, the positioning angle can preferably be set according to a discrete number of step values in the range 0 to 90 degrees, or any value in the range −90 degrees to 90 degrees.

According to yet another embodiment, the means for securing the position may relate to locking-pin-based positioning, whereby the knee joint preferably comprises a first surface comprising at least a first hole and a second surface comprising at least a second hole, said first and second surface adapted for interlocking of said first surface and said second surface by means of a locking pin guided through set first hole and set second hole, for fixing said positioning angle. In such an embodiment, the positioning angle can preferably be set according to a discrete number of step values in the range 0 to 90 degrees, or any value in the range −90 degrees to 90 degrees.

In another preferred embodiment, the means for securing the position may relate to screw-based positioning, whereby the knee joint preferably comprises said knee pin extending along said positioning axis, said knee pin comprises screw thread at one end extending beyond said knee joint, said screw-threaded end adapted for being receiving by a bolt in a releasably attachment for securing a position of said knee joint. In such an embodiment, the positioning angle can preferably be set continuously, i.e. taking on any angle in a given range, e.g. any value in the range 0 to 90 degrees, or any value in the range −90 degrees to 90 degrees. In another embodiment, the screw-based positioning is combined with said recess-based positioning, wherein a certain interlocking realized by means of recesses and protrusions may be secured by means of a screw, preferably by means of said knee pin comprising screw thread.

The invention is further described by the following non-limiting example which further illustrates the invention, and is not intended to, nor should it be interpreted to, limit the scope of the invention.

Figure 2:
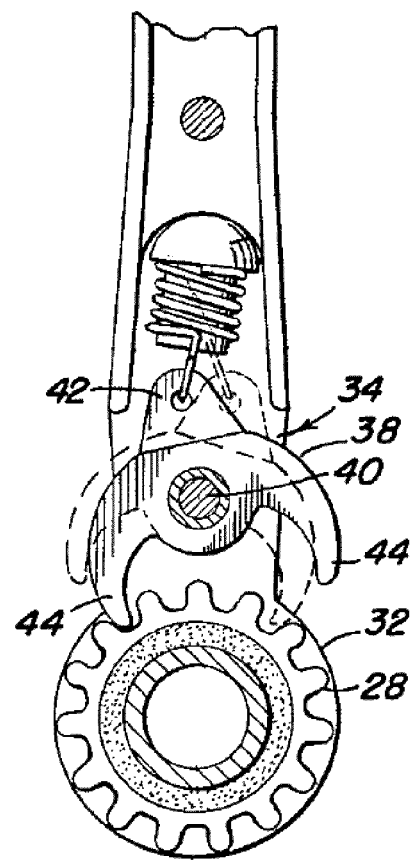
FIG. 2 is a fragmentary sectional view of the ratchet mechanism used in the prior art load binder according to U.S. Pat. No. 2,673,632.
Figure 3:
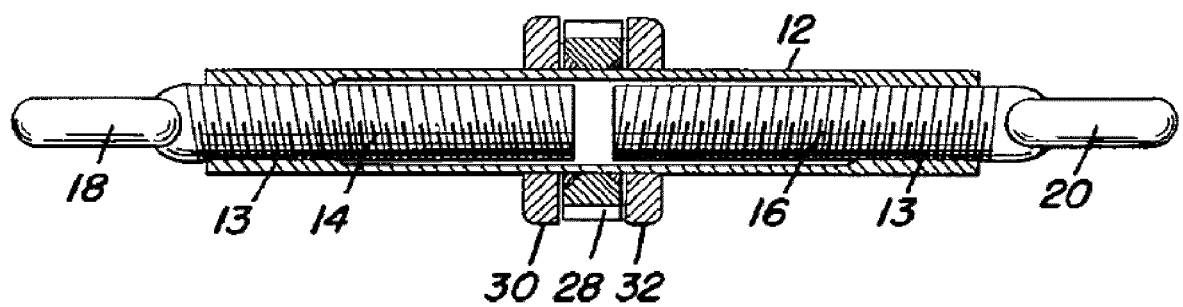
FIG. 3 is a longitudinal sectional view of the prior art load binder according to U.S. Pat. No. 2,673,632 on the section plane of the line A-A' in FIG. 1.

Example: Prior Art Load Binder and Example Load Binder According to the Present Invention FIGS. 1-3 show different views of the prior art load binder according to U.S. Pat. No. 2,673,632 which comprises a ratchet mechanism. Like characters of reference are employed to designate like parts.

FIG. 1 provides a side elevation view, whereas FIG. 2 offers a fragmentary sectional view of the ratchet mechanism. FIG. 3 provides a longitudinal sectional view according to the section plane of the line A-A' in FIG. 1.

The prior art load binder is provided with a ratchet turnbuckle 10, this embodying in its construction an elongated, preferably tubular member 12 having its opposite end portions "upset" by a machine process so as to thicken the wall of the tubular member in these regions, as at 13, and the upset end portions are screw-threaded in relatively opposite directions so as to accommodate correspondingly screw threaded shanks 14, 16 of a pair of eyes 18, 20 respectively, so that when the member 12 is rotated in one direction, the eyes 18, 20 are drawn together, while rotation of the member in a relatively opposite direction causes the eyes to spread apart. The eyes 20, 18, in turn, are connected by suitable links 22 to a pair of hooks 24 which are engageable with the links at the ends of a length of chain 26, so that by rotating the member 12, the chain 26 may be loosened or tightened, as desired.

Rotation of the member 12 is effected by a ratchet mechanism which involves the provision of a ratchet wheel 28 which is suitably secured intermediate the ends of the member 12 and is rotatably mounted between mutually spaced side members 30, 32 which project from a hollow head or housing 34 on one end of an oscillatory handle 36.

The head 34 also accommodates what may be referred to as a doubled-ended pawl 38 which is pivotally mounted on a pin or screw 40 extending between the members 30, 32, it being noted that a central portion of the pawl 38 is provided with an apertured ear, protuberance or lug 42, while the opposite side portions of the pawl assume the form of a pair of heels 44 which are selectively engageable with the ratchet wheel 28.

Means are provided to swing the pawl 38 laterally, to one side or the other, thus engaging one or the other of the heels 44 of the pawl with the ratchet wheel 28, whereby oscillation of the handle 36 will impart rotation to the wheel 28 and to the associated member 12 in a predetermined direction. The direction of rotation of the member if may be reversed by simply pressing a heel of the pawl 38 into operative engagement with the ratchet wheel 28.

Figure 4:
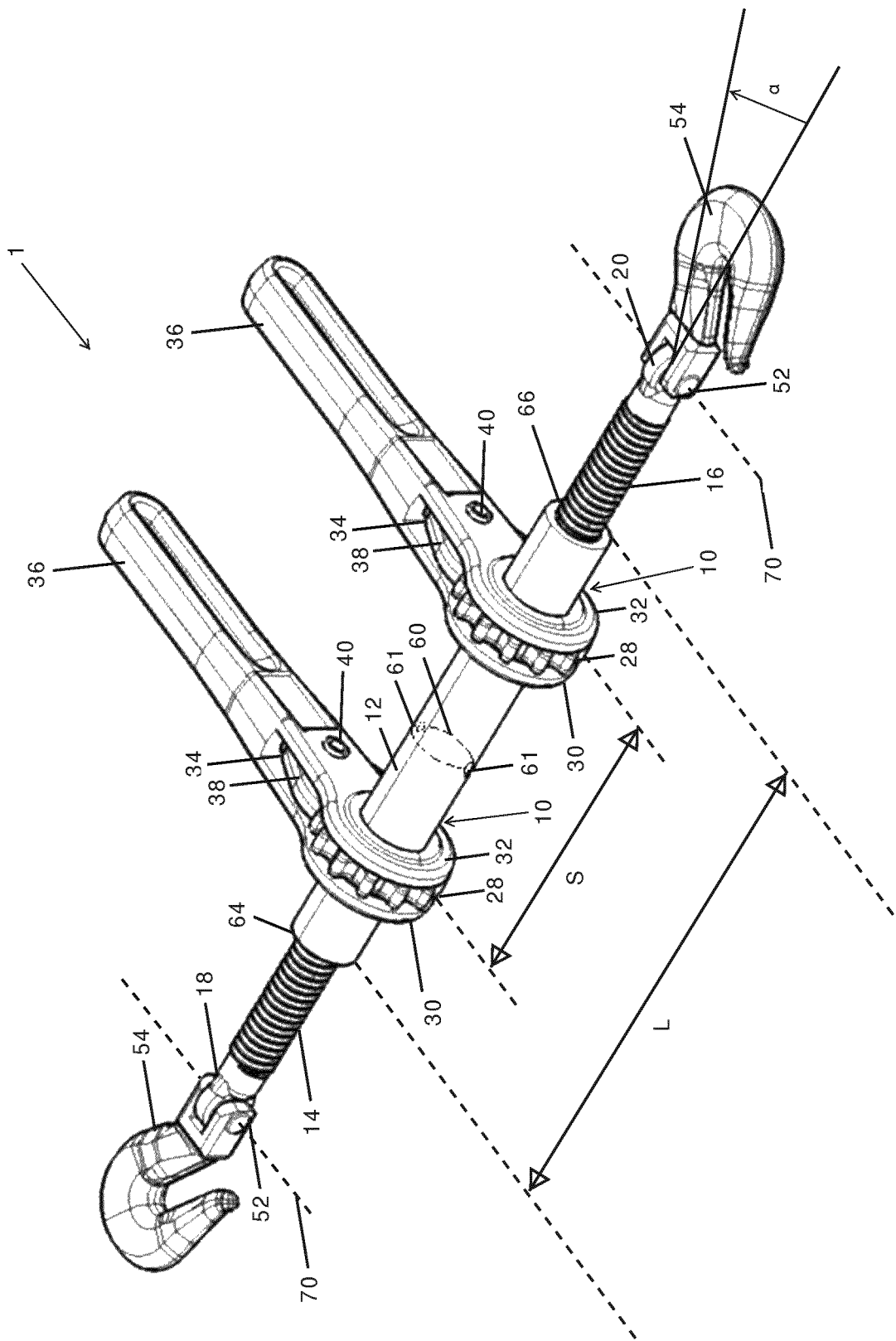
FIG. 4 shows an example embodiment of the load binder according to the present invention.

FIG. 4 shows an example embodiment of the load binder 1 according to the present invention. Similar to the prior art load binder, the load binder 1 comprises a single elongated, preferably tubular member 12 whereof the end portions have inner screw threads in relatively opposite directions. These are adapted to accommodate correspondingly threaded shanks 14, 16 of a pair of distal end points, preferably eyes 18, 20, so that when the member 12 is rotated in one direction, the eyes 18, 20 are drawn together, while rotation of the member in a relatively opposite direction causes the eyes to spread apart. In one embodiment, similar to the prior art load binder, the opposite inner end portions may be "upset" by a machine process so as to thicken the wall of the tubular member in these regions, whereby the end portions are screw-threaded.

Different from the prior art load binder, the load binder 1 according to the present invention comprises two oscillatory handles 36 instead of one, each of the handles 36 actuating a separate ratchet turnbuckle 10. The second handle 36 is essentially identical to the first handle 36. Furthermore, the first handle 36 and said second handle 36 are provided essentially symmetrically with respect to a middle section 60 of said member 12. Furthermore, the first and said second handle 12 are separated by a spacing S equaling at least 40% of a length L of said member 12, preferably at least 45% of said length L. Hereby, the length L of the member 12 corresponds to the distance between the axially outermost ends 64, 66 of the end portions of the member 12. Furthermore, said percentage may be obtained as the ratio of the distance S between the middle sections of the first and second ratchet wheel and the length L of the member.

The member 12 comprises a first and second opening 61 provided intermediate the first and second handle 36. Said first and second opening 61 are provided on the middle section 60 of said member 12 and are provided essentially diametrically with respect to each other.

In a preferred embodiment not shown on FIG. 4 and different from the prior art load binder, the elongate member 12 consists of three mutually attached member segments. It concerns one central segment extending between and beyond the two ratchet turnbuckles 10 and two end segments with opposite screw threading at the two ends of the member 12. Hereby, the diameters of the central segment and the two end segments are such that the end segments may be received by the central segment in a clamping attachment. The segments preferably comprise metal, and said clamping attachment is preferably further fixated by welding. Furthermore, in a preferred embodiment, the central segment may be tubular and be characterized by a first wall thickness, while the two ends segments may have a circular inner cross section comprising the screw thread and a polygonal outer cross section, such as a hexagonal outer cross section, with a second wall thickness of which the average value exceeds the first wall thickness. Such an embodiment is advantageous both in manufacturing and in use of the load binder 1. First, the manufacturing of the member 12 is much easier than for the prior art load binder, for which "upset" portions need to be provided and screw-threaded by separate machine processes which involve the complete member 12. In contrast, for a member 12 comprising three segments, two end segments with appropriate diameter may simply be selected from a range of existing machine parts, so avoiding the need for providing upset portions. Related, the process of providing screw treads only involves the end segments, which are to be combined with the central segment only later on in the manufacturing. Second, the resulting load binder advantageously combines the provision of the ratchet turnbuckles near the two ends of the member 12 with the clamping attachment of the end segments by the central segment. Particularly, in a preferred embodiment whereby the central segment extends not more than 50 mm beyond the axially outermost members 30, 32 next to each of the handles 36, more preferably not more than 30 mm, the clamping of the central segment by the ratchet wheel provides for additional support of the clamping of the end segments by the central segment, and hence for additional structural integrity in the use.

Finally, the distal ends 18, 20 are eyes, and the load binder 1 further comprises two hooks 54 mounted on said eyes according to a knee joint involving a knee pin 52. The two hooks 54 are rotatably mounted on said eyes according to said knee joint. The knee joint comprises a positioning axis 70, whereby said knee pin 52 extends along said positioning axis 70. The knee joints comprise means for securing a position of said knee joint with respect to said positioning axis 70 according to a positioning angle α. The means for securing the position concern friction-based positioning, whereby the knee pin 52 is adapted to provide for friction with respect to rotation along the positioning axis 70, allowing the operator to control the positioning angle. The positioning angle α can be set continuously, i.e. taking on any angle in some given range, e.g. any value in the range −90 degrees to 90 degrees.

The invention claimed is:

1. A load binder comprising an axially extending elongate member, two shanks, a first ratchet wheel and a first oscillatory handle; said member comprising end portions comprising inner screw threads in relatively opposite directions so as to accommodate said shanks which are correspondingly screw-threaded and which comprise distal ends; whereby rotation of the member in one direction causes the distal ends to draw together and rotation of the member in relatively opposite direction causes the distal ends to spread apart; whereby said rotation of said member is effected by a ratchet mechanism which involves the provision of said first ratchet wheel which is suitably secured intermediate the ends of the member and is rotatably mounted between mutually spaced first side members which project from said first handle;

wherein said load binder comprises a second ratchet wheel and a second oscillatory handle; whereby said ratchet mechanism involves the provision of said second ratchet wheel which is suitably secured intermediate the ends of the member and is rotatably mounted between mutually spaced second side members which project from said second handle.

2. The load binder according to claim 1, wherein the second handle is identical to the first handle.

3. The load binder according to claims 1 and 2, wherein said first handle and said second handle are provided symmetrically with respect to a middle section of said member.

4. The load binder according to claim 1, wherein said first and said second handle are separated by a spacing (S) equaling at least 40% of a length (L) of said member.

5. The load binder according to claim 1, wherein said member is composed of metal for at least 80 percent by volume.

6. The load binder according to claim 1, wherein said first and second handle are composed of aluminum for at least 80 percent by volume.

7. The load binder according to claim 1, wherein said member comprises a first opening provided intermediate the first and second handle.

8. The load binder according to claim 7, wherein said member comprises at least a second opening provided intermediate the first and second handle and diametrically with respect to said opening.

9. The load binder according to claim 1, wherein said member comprises a central segment extending between and beyond the first and second handle having a first cross diameter and two end segments comprising said end portions comprising said inner screw threads in relatively opposite directions and having an identical second cross diameter;

wherein said first cross diameter of the central segment and said second cross diameter of the two end segments are such that the end segments may be received by the central segment in a clamping attachment.

10. The load binder according to claim 9, wherein the central segment and the end segments comprise metal, and that said clamping attachment is fixated by welding the central segments and the two end segments together.

11. The load binder according to claim 9, wherein the central segment is tubular and is characterized by a first wall thickness with a first average value;

wherein the two ends segments have an identical circular inner cross section comprising said inner screw threads and an identical polygonal outer cross section; and wherein said two end segments are characterized by a second wall thickness with a second average value exceeding said first average value.

12. The load binder according to claim 1, wherein at least one of said first and said second handle is detachable.

13. The load binder according to claim 1, wherein said two shanks comprise a first shank and a second shank; said first shank having an axially extending cylindrical void adapted to telescopically receive therewithin said second shank, said second shank having an outside diameter smaller than an inside diameter of said cylindrical void;

wherein said second shank includes a screw-threaded length at least long enough to extend from an axially outermost end of one of said end portions to a position radially adjacent to the inner screw threads of the opposite end portion;

wherein the screw threads of said second shank have a pitch which is greater than a pitch of the screw threads of said first shank;

wherein said cylindrical void of said first shank has a length at least long enough to extend from an axially innermost end of one of said end portions to a position radially adjacent to the inner screw threads of the opposite end portion; and wherein said end portions of said member comprise inner screw threads adapted to the second shank having said outside diameter smaller than an outside diameter of the first shank and the screw threads of the second shank having greater pitch than the screw threads of the first shank.

14. The load binder according to claim 1, wherein for at least one of said first and second handle said ratchet mechanism comprises a means for varying a transmission ratio between oscillatory displacement of the handle and rotary displacement of the member.

15. The load binder according to claim 1, wherein said distal ends are eyes; and in that said load binder further comprises at least one hook, rotatably mounted on said eyes according to a knee joint comprising a positioning axis.

16. The load binder according to claim 15, wherein at least one of said knee joints comprises means, for securing a position of said knee joint with respect to said positioning axis according to a positioning angle (a).

* * * * *